United States Patent

[11] 3,587,885

| [72] | Inventor | Howard D. Hanway |
| | | 613 W. 6th St., Hastings, Nebr. 68901 |
| [21] | Appl. No. | 820,512 |
| [22] | Filed | Apr. 30, 1969 |
| [45] | Patented | June 28, 1971 |

[54] MATERIAL HANDLING APPARATUS FOR VEHICLES
9 Claims, 11 Drawing Figs.

[52] U.S. Cl. ................................................ 214/84,
 214/85, 214/1, 193/42, 193/35
[51] Int. Cl. ........................................................ B60p 1/52
[50] Field of Search ............................................ 214/1 (P), 1
 (PL), 84, 85; 193/35, 37, 42, 2—5

[56] References Cited
UNITED STATES PATENTS
| 252,960 | 1/1882 | Moore | (214/84) |
| 315,034 | 4/1885 | Holman | 193/35X |
| 379,178 | 3/1888 | Moore | (193/35) |
| 508,868 | 11/1893 | Byers | 193/42 |
| 1,525,451 | 2/1925 | Kurtz | (214/1P) |
| 3,034,668 | 5/1962 | Wicks | 214/1(PL)X |
| 764,491 | 5/1904 | NewLove | 193/42 |

*Primary Examiner*—Albert J. Makay
*Attorney*—Gene D. Watson

ABSTRACT: An apparatus for unloading elongated objects from a vehicle. Dolly members are attached to a load carrying surface of the vehicle, the dolly members being in alignment with each other and having object supporting elements such as rollers or the like, located generally below the level of the surface and permitting substantially frictionless movement of the object in the direction of alignment of the dolly members for removing the elongated object therefrom. A chute extends downwardly from the end dolly member to provide gradual movement to the ground of the last end of the object to leave the dolly members.

INVENTOR
HOWARD D. HANWAY

BY *Gene D. Watson*

ATTORNEY

INVENTOR
HOWARD D. HANWAY

BY *Gene D. Watson*
ATTORNEY

INVENTOR
HOWARD D. HANWAY

BY *Gene D. Watson*

ATTORNEY

MATERIAL HANDLING APPARATUS FOR VEHICLES

BACKGROUND OF THE INVENTION

This invention relates to material handling; and in particular it relates to an apparatus for facilitating removal of elongated objects from a vehicle.

Elongated objects such as pipes, wooden poles, and the like, are normally transported from place to place on suitable vehicles such as flat bed trailers or the like. In view of their considerable weight, special problems are encountered when unloading such elongated objects from a vehicle. One solution is to simply pull or roll the objects off the vehicle and onto the ground. However, it is immediately apparent that this solution is of very limited applicability in view of the considerable likelihood of damage to all but the most rugged of objects.

Consequently, where the objects cannot be simply dropped off the vehicle, the conventional procedure for unloading such objects is to use a separate power means. The vehicle itself may be provided with a boom and a cable arrangement; or a separate power unit such as a crane could be provided at the unloading site. In either event, it is apparent that these procedures require considerable expenditures in terms of equipment and/or man-hours.

Thus, there exists a need for an apparatus to unload elongated objects from vehicles, which apparatus is both economical and safe for the objects being unloaded.

SUMMARY OF THE INVENTION

Thus, it is a purpose of this invention to provide a new and improved arrangement for unloading elongated objects from vehicles.

Briefly, the purpose of the present invention is achieved by providing a fairly simple apparatus including an arrangement of dolly members easily mountable on a vehicle, whereby the elongated objects are rolled sideways onto the apparatus. The dolly members permit substantially frictionless lengthwise movement of the elongated objects, and the last end of the elongated object to leave the dolly members is lowered gradually to the ground without being dropped.

As noted earlier elongated objects are normally transported on vehicles having a generally flat load carrying surface. In accordance with a feature of the present invention, a plurality of dolly members are mounted on the vehicle, relative to the said load carrying surface, such that the elongated objects may conveniently be rolled sideways from the said load carrying surfaces onto the dolly members. Preferably, although not necessarily, the load supporting means of the dolly members is located at a level slightly below the level of the said load carrying surface so that the elongated objects may simply be rolled off an edge of the load carrying surface and onto the supporting means of the dolly members. Further, although these dolly members may be located at any transverse position across the load carrying surface, the members are preferably arranged along a lateral edge of the load carrying surface.

In fact, it is another object of the invention that the dolly members may conveniently be mounted directly in the pockets which are normally formed along the edge of a flat bed trailer, for normally receiving stakes, side panels, or the like to prevent the objects from falling off the vehicle.

Thus, in accordance with a preferred arrangement of the present invention, each dolly member comprises a base member extending from a first end to a second end. Means are provided at the first end for connecting the dolly member to the side of the vehicle, and preferably for connecting the dolly member into the pockets, referred to above, normally provided on a flat bed trailer for stakes and the like. Above this base member the dolly member includes support means for supporting the elongated object so as to permit substantially frictionless movement thereof in a direction transverse to the direction from the first end to the second end of the dolly member.

During an unloading operation, a plurality, for example three dolly members will normally be employed. For a purpose to be described in greater detail below, an end one of these dolly members will differ from the other members in that it will have attached thereto a chute extending from the support means of that dolly member downwardly to the ground in a direction away from the other dolly members. This will provide a means for gradually lowering the last end of the elongated object to leave the dolly members.

Thus, it is an object of this invention to provide a new and improved apparatus for unloading elongated objects from vehicles.

It is another object of this invention to provide a simplified apparatus for unloading objects from vehicles, which apparatus may be mounted directly in the pockets which are normally provided along the edge of a trailer for receiving stakes, side panels or the like.

It is another object of this invention to provide a new and improved dolly member, adapted to use for unloading objects from vehicles, which member includes a means at one end for attaching the dolly member to a vehicle, and support means in the center thereof for supporting the objects being unloaded from the vehicle.

It is another object of this invention to provide a vehicle unloading apparatus including a dolly member attachable at one end thereof to a vehicle, and including a chute extending from the dolly member downwardly to the ground.

It is another object of this invention to provide an arrangement whereby a plurality of dolly members are mounted along an edge of a vehicle, and in alignment with each other, for permitting substantially frictionless movement of an elongated object in a direction parallel to the said edge of the vehicle.

Other objects and the attendant advantages of the present invention will become apparent from the detailed description to follow, together with the accompanying drawings.

BRIEF DESCRIPTION OF THE DRAWINGS

There follows a detailed description of preferred embodiment of the present invention, together with accompanying drawings, the description and the drawings being provided only for the purpose of illustrating a preferred embodiment of the invention.

DETAILED DESCRIPTION OF THE PREFERRED EMBODIMENT

Referring now to the FIGS. like numerals are used to represent like elements throughout the several views.

Figure 1:
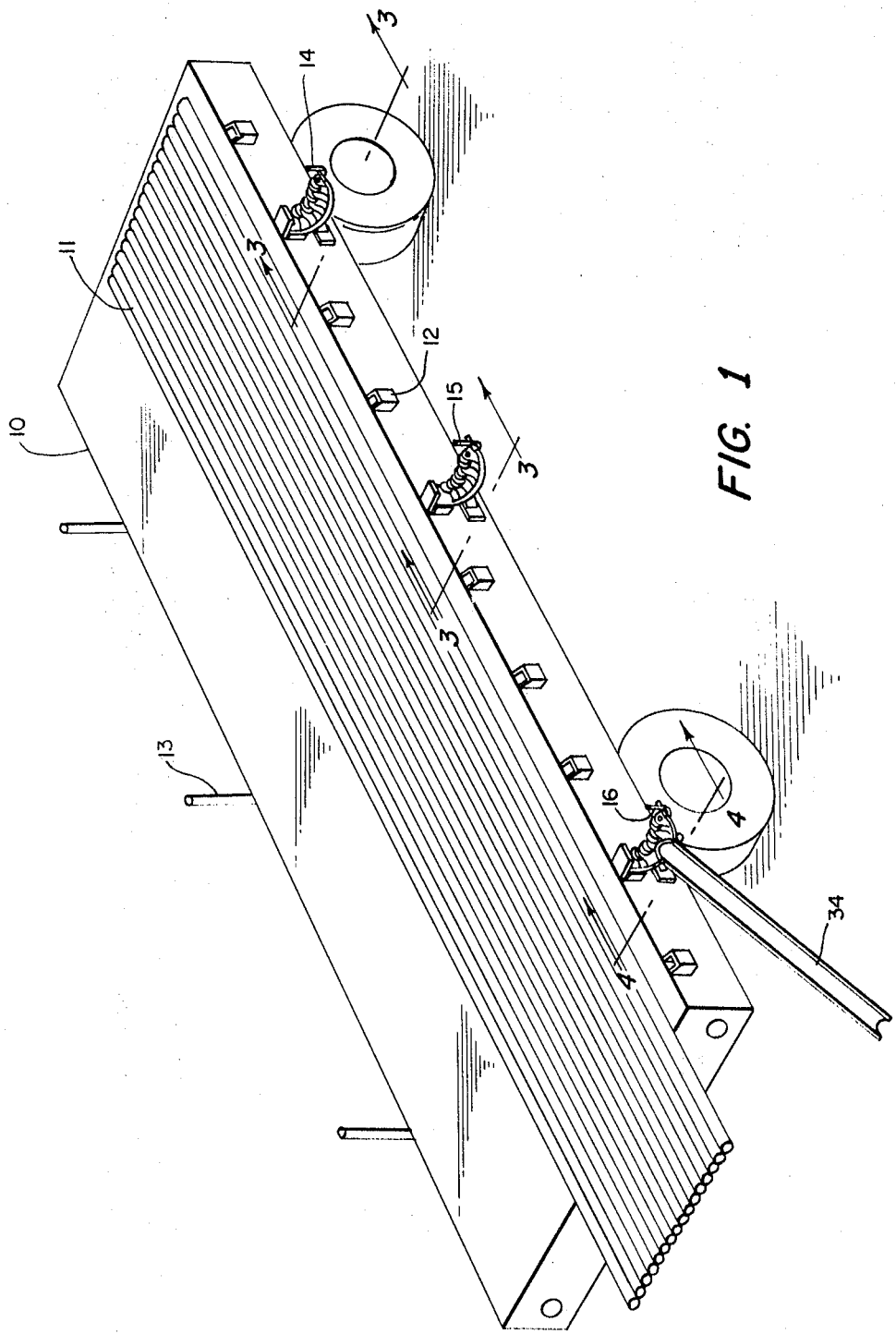
FIG. 1 is a perspective, schematic illustration of a flat bed trailer incorporating an unloading apparatus constructed in accordance with the present invention.

FIG. 1 illustrates a vehicle 10 which may be, for example, a flat bed trailer, for carrying elongated objects 11, such as pipes, logs, etc. Trailers of this type are normally provided with pockets 12 along at least their lateral edges for receiving a raised sidewall construction such as stakes 13 to prevent the elongated objects 11 from falling off the side edges of the vehicle. On one side of the vehicle 10, all of the stakes 13 have been removed and a plurality of dolly members 14, 15 and 16 have been attached to selected ones of the pockets 12 which are located at appropriate positions along the edge of the vehicle for removing the elongated objects 11. It should be apparent that any number of dolly members may be employed and that these dolly members may be located at any desired position along the length of the vehicle. Further, all dolly members would normally be identical to each other, except for the rearwardmost dolly member. Thus, in the arrangement as shown in FIG. 1, dolly members 14 and 15 are identical to each other, while the rearwardmost dolly 16 differs from the other dolly members by the inclusion of a chute, the structure and purpose of which will be explained in greater detail below.

Figure 2:
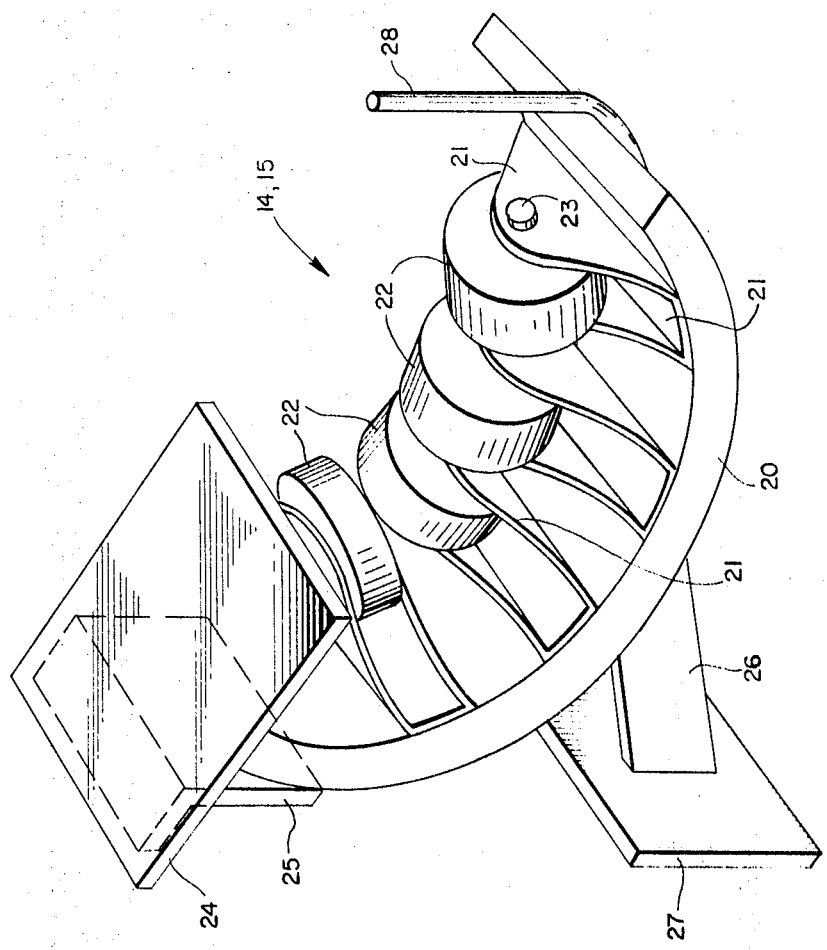
FIG. 2 is a perspective view showing a dolly member constructed in accordance with the features of the present invention.
Figure 3:
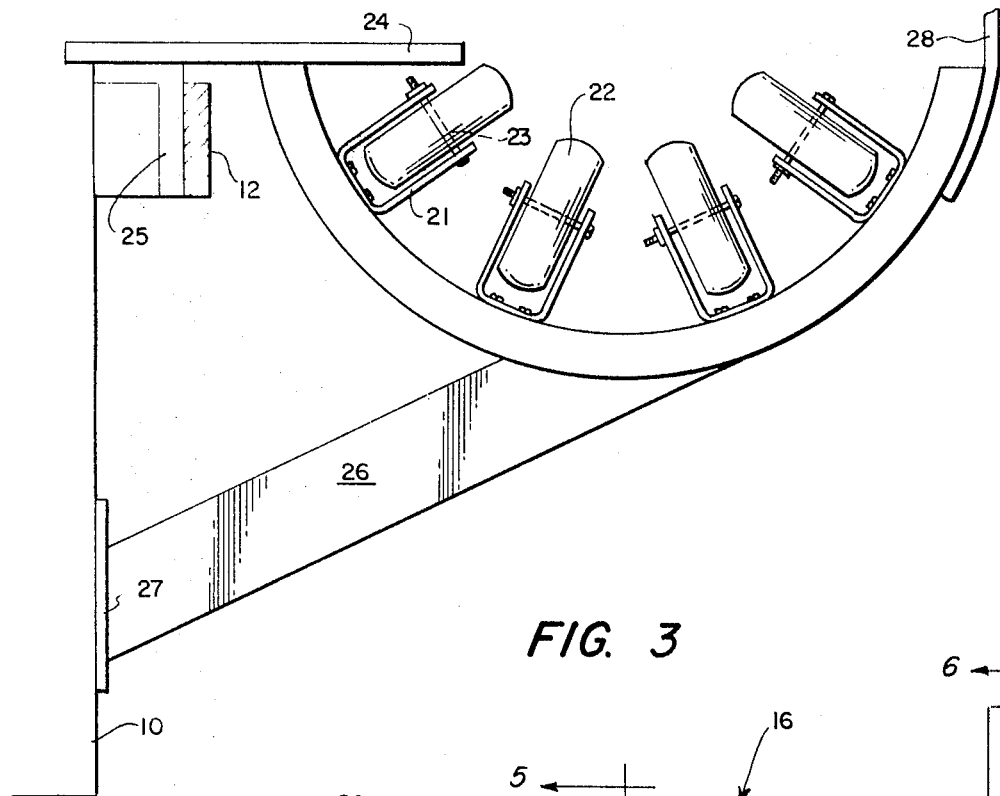
FIG. 3 is an elevational view taken along either of the lines 3-3 of FIG. 1.

FIGS. 2 and 3 illustrate, in detail, the construction of the dolly members 14 and 15. These dolly members include a base 20 extending from a first end to a second end of the dolly member. Mounted on this base is a support means including castor units 21 which support rollers 22 for rotational movement about pivot pins 23. In the illustrated arrangement, the baseplate 20 is curved, concave upwardly, whereby the tops of the rollers 22 lie in a path which is also concave upwardly. This arrangement has the advantage that the weight of the elongated object is more evenly distributed over the rollers 22, and hence over the base plate 20. However, other arrangements are also encompassed within the scope of the invention. For example, if the objects to be removed from the vehicle have a generally flat lower surface, then it may be desirable to extend the baseplate 20 in a horizontal plane such that the tops of the rollers also lie in a horizontal plane.

A flat plate 24 is connected to one end of the baseplate 20 and forms a platform extending from the tops of the rollers to the edge of the vehicle 10. An angle iron 25 projects downwardly from this plate 24 and is adapted to extend into a pocket 12 of the vehicle 10. Further support is provided by a bottom frame member 26, which is connected at its upper end to the bottom of the baseplate 20 and which is connected at its other end to a bottom supporting plate 27 which rests against the side of vehicle 10. If desired, bolts may be proved for connecting the plate 27 to the side of vehicle 10. However, in normal operation, the weight of the dolly member will urge the plate 27 against the side of vehicle 10 with sufficient force such that additional connecting means would not be necessary.

Figure 4:
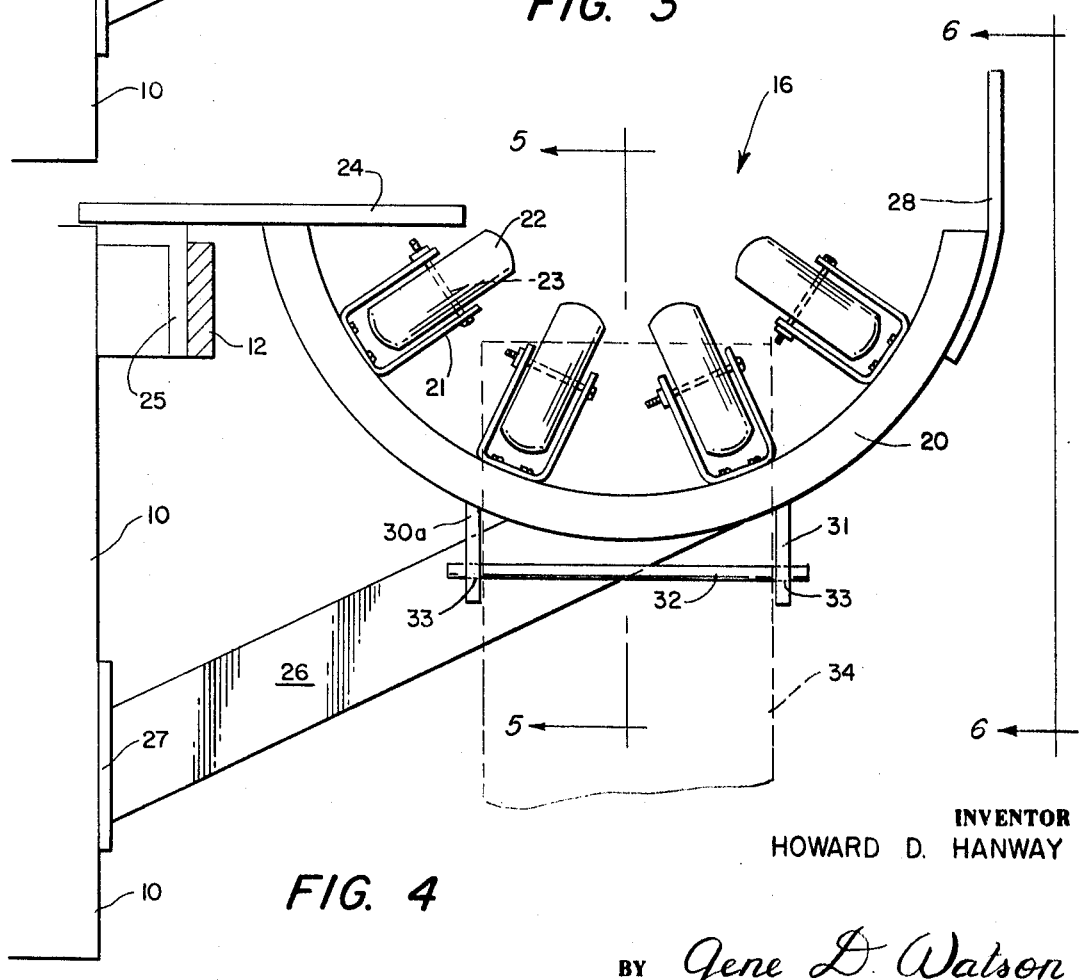
FIG. 4 is an elevational view taken along line 4-4 of FIG. 1 wherein a portion thereof is shown in dotted lines for purposes of clarity.
Figure 5:
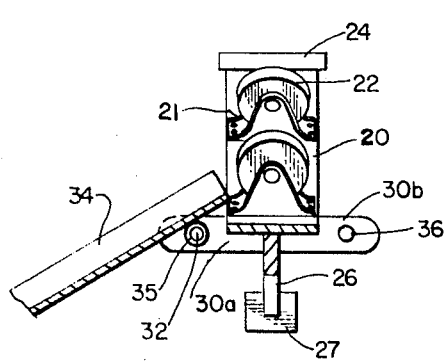
FIG. 5 is a sectional view taken along line 5-5 of FIG. 4.
Figure 6:
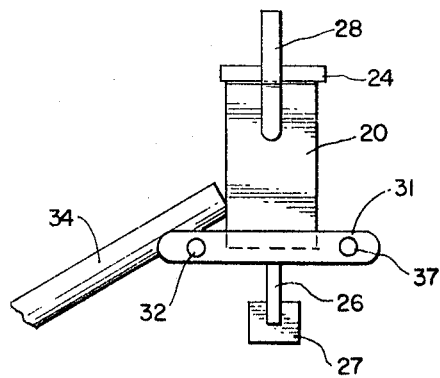
FIG. 6 is an end elevational view taken along line 6-6 of FIG. 4.

FIGS. 4 through 6 illustrate the dolly member 16 which is identical to the dolly members 14 and 15 except for the addition thereto of elements 30 through 37 which include the chute 34 and the means for attaching the chute. For purposes of clarity the chute has been shown in FIG. 4 in dotted lines only.

As best shown in FIG. 5, a pair of identical brackets 30a and 30b are attached to each side of the bottom frame member 26 and to the underside of base 20; and as best shown in FIG. 6, a bracket 31 is connected to the bottom of base 20 beyond the bottom frame member 26. The bracket 30a and the left end of bracket 31, (as shown in FIG. 6) include aligned holes 33 for receiving a pivot rod 32. On the opposite side of the dolly member, the bracket 30b and the right-hand side of bracket 31 (as shown in FIG. 6) include aligned apertures 36 and 37. In practice, only one set of aligned apertures would be used at any one time. However, this arrangement provides maximum flexibility in use as the chute may be added to either side of the dolly member. The chute, which is open-topped and partly cylindrical, includes a hollow rod 35 fixed to the bottom thereof. In practice, the rod 35 is placed between a set of aligned apertures after which the rod 32 is passed through the aligned apertures and the hollow rod 35. In this manner, the chute 34 is firmly connected to the brackets of the dolly member and adapted for pivotal movement about the axis of pivot rod 32.

It should be apparent that the apparatus of the present invention can be utilized in a number of different advantageous ways. However, one particularly advantageous operation of the present invention is described below with respect to FIGS. 7a through 7e.

Referring now to FIGS. 7a through 7e, it will be assumed that the elongated objects 11 are long pipes, too heavy to be lifted by one man. Dolly members 14 through 16 are mounted on the vehicle 10, as shown in FIG. 1, with the chute 34 extending rearwardly and downwardly from dolly member 16.

Figure 7A:
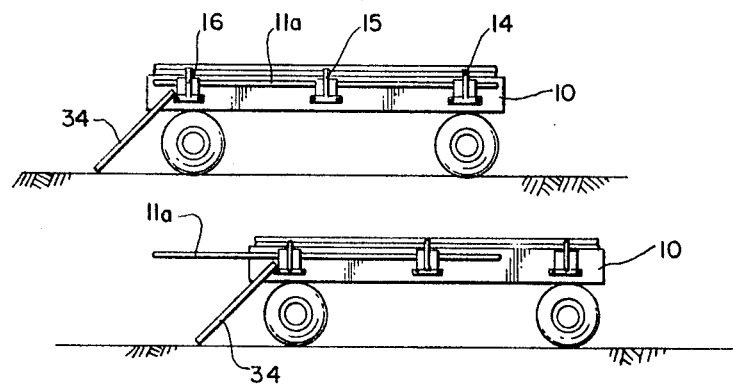
FIGS. 7a through 7e are schematic views illustrating the application of the invention.
Figure 7B:
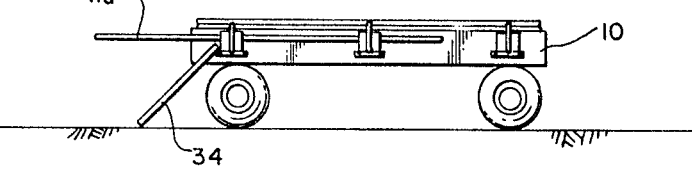
Figure 7C:
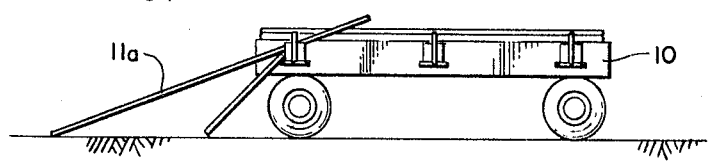
Figure 7D:
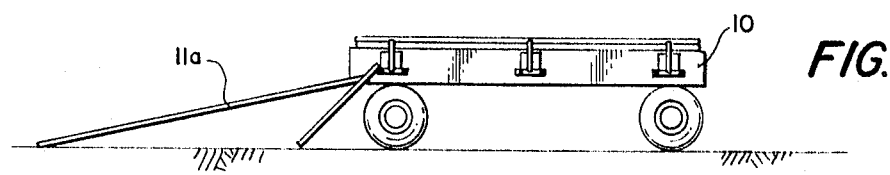
Figure 7E:
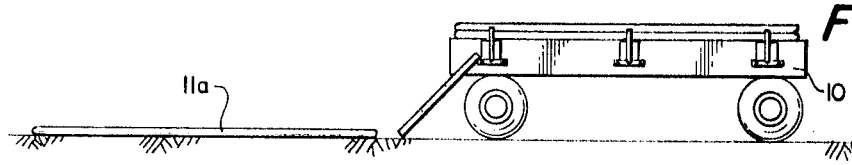

In the first step, as shown in FIG. 7a, a single elongated object such as object 11a is rolled off the edge of the vehicle onto the dolly members 14 through 16. At this point a man takes hold of the rear end of the object 11a, while the driver moves the vehicle forwardly as shown in FIG. 7b. Soon the center of gravity will pass rearwardly of the dolly members so that the rear end of object 11a will fall to the ground, as shown in FIG. 7c. The truck continues to be driven forwardly, as a result of which the forward end of the object 11a, will move gradually down the chute 34, as shown in FIG. 7d, and this movement of the vehicle will continue until the object lies flat on the ground as shown in FIG. 7e.

Thus, by utilizing the present invention in the above manner, very heavy elongated objects can be moved to the ground economically, and without damage to the objects. Further, the procedure described above is particularly advantageous when laying pipes end to end in a narrow space, such as an alleyway, where it is not possible to use additional equipment along the side of the vehicle.

Although the invention has been described inconsiderable detail with respect to a preferred embodiment thereof, it will be apparent that the invention is capable of numerous modifications and variations apparent to those skilled in the art, without departing from the spirit and scope of the invention.

I claim:

1. A dolly member for use in connection with a vehicle and with other dolly members for unloading elongate objects from a bed surface of the vehicle along an edge of said bed surface, said dolly member comprising a base member having first and second ends; mounting means for firmly and removably attaching said base member adjacent its first end to the side of the vehicle adjacent an edge of the bed surface thereof such that the second end extends outwardly from the side of the vehicle, and the base member, in large part, is located generally below the bed surface of the vehicle; roller means carried by said base member between said first and second ends to receive from said surface and support an elongate object and to permit substantially frictionless movement of the object in a direction transversely of said base member and generally parallel to said edge, the uppermost extent of said roller means being generally no higher than the bed surface of the vehicle when the dolly member is mounted on the vehicle, said roller means comprising a plurality of roller members with their uppermost surfaces arranged in an upwardly concave path between said first and second ends; said mounting means comprising an upper mounting member connected to said base member for fitting downwardly into a pocket of the vehicle along an edge of the bed surface thereof, and a lower mounting member connected to said base member for bearing against the side of the vehicle below said upper mounting member so as to cause said base member to stand proud from the side of the vehicle; means defining a platform extending generally from an area slightly above and adjacent the innermost extent of the upper surface of said roller means to an area adjacent the edge of the vehicle, and generally adjacent the plane of said surface, so as to permit rolling movement of an elongate object from said surface, across said platform, and onto said roller means; a chute; and means for pivotally coupling said chute to said dolly member such that the chute extends transversely of said base member and generally downwardly therefrom.

2. Apparatus as claimed in claim 1 wherein said base member is of upwardly concave configuration between its first and second ends, and said roller members extend generally radially from the upper surface of the base member.

3. Apparatus as claimed in claim 2 wherein one end of said platform terminates adjacent the uppermost surface of the innermost roller relative to said first end of said base member, and extends therefrom over said first end of said base member and said upper mounting member toward the edge of the vehicle, and is connected to said first end and to said upper mounting member.

4. Apparatus as claimed in claim 1 comprising means for releasably coupling said chute to said dolly member on either side of said base member.

5. Apparatus as claimed in claim 1 wherein the axial extent of said base member parallel to the edge of the vehicle is substantially less than its transverse extent as defined by said first and second ends.

6. Apparatus as claimed in claim 1 wherein said base member is arcuately formed between said first and second ends so as to be upwardly concave, and wherein said platform comprises a generally planar member connected intermediate its ends to the inner end of said base member and to said upper mounting member so as to extend across the inner end of said base member and said upper mounting member and bridge the distance between the edge of the vehicle and the roller means.

7. Apparatus as claimed in claim 6 wherein said lower mounting member is connected to said base member and extends downwardly and away therefrom to bear against the side of the vehicle at an area substantially below the base member and the roller means.

8. Apparatus as claimed in claim 6 wherein said roller means comprises a plurality of rollers mounted along the arcuate upper surface of said base member such that the tops of the rollers define an upwardly concave curved path, and wherein said platform member extends approximately to one end of said curved path.

9. A dolly member for use in combination with a vehicle and with other dolly members for unloading elongate objects from a bed surface of the vehicle along an edge of said bed surface, said dolly member comprising a base member having first and second ends; mounting means for firmly and removably attaching said base member adjacent its first end to the side of the vehicle adjacent an edge of the bed surface thereof such that the second end extends outwardly from the side of the vehicle, and the base member, in large part, is located generally below the bed surface of the vehicle; roller means carried by said base member between said first and second ends to receive from said surface and support an elongate object and to permit substantially frictionless movement of the object in a direction transversely of said base member and generally parallel to said edge, the uppermost extent of said roller means being generally no higher than the bed surface of the vehicle when the dolly member is mounted on the vehicle; said mounting means comprising an upper mounting member connected to said base member for fitting downwardly into a pocket of the vehicle along an edge of the bed surface thereof, and a lower mounting member connected to said base member for bearing against the side of the vehicle below said upper mounting member so as to cause said base member to stand proud from the side of the vehicle; means defining a platform extending generally from an area slightly above and adjacent the innermost extent of the upper surface of said roller means to an area adjacent the edge of the vehicle, and generally adjacent the plane of said surface, so as to permit rolling movement of an elongate object from said surface, across said platform, and onto said roller means; said base member being arcuately formed between said first and second ends so as to be upwardly concave, said roller means comprising a plurality of roller members with their uppermost surfaces arranged in an upwardly concave path between said first and second ends, and said platform comprising a generally planar member connected intermediate its ends to the inner end of said base member and to said upper mounting member so as to extend across the inner end of said base member and said upper mounting member and bridge the distance between the edge of the vehicle and the roller means.